United States Patent

Nosowicz et al.

[11] Patent Number: 5,722,671
[45] Date of Patent: Mar. 3, 1998

[54] SEAL ARRANGEMENT

[75] Inventors: Josef Nosowicz, Geretsried; Michael Riedl, Eurasburg; Rudolf Kollinger, Königsdorf, all of Germany

[73] Assignee: Feodor Burgmann Dichtungswerke GmbH & Co., Wolfratshausen, Germany

[21] Appl. No.: 783,863

[22] Filed: Jan. 16, 1997

[30] Foreign Application Priority Data

Jan. 17, 1996 [DE] Germany ............... 29600707 U

[51] Int. Cl.[6] .................................... F16J 15/54
[52] U.S. Cl. .................................... 277/408
[58] Field of Search ............... 277/17, 18, 19, 277/81 R, 65

[56] References Cited

U.S. PATENT DOCUMENTS

| 2,244,450 | 6/1941 | Erni | 286/11 |
|---|---|---|---|
| 2,300,385 | 10/1942 | Kollberg et al. | 277/17 |
| 2,968,250 | 1/1961 | Lobanoff | 103/111 |
| 3,236,529 | 2/1966 | Heim | 277/18 |
| 3,392,983 | 7/1968 | Hajner | 277/28 |
| 3,608,910 | 9/1971 | Tyler | 277/15 |
| 4,502,693 | 3/1985 | Lesiecki et al. | 277/17 |
| 4,799,544 | 1/1989 | Curlett | 277/215 |
| 5,209,503 | 5/1993 | Heibel et al. | 277/227 |

FOREIGN PATENT DOCUMENTS

| 681 328 | 5/1930 | France . |
| 861 557 | 2/1961 | United Kingdom . |
| 1 302 475 | 1/1973 | United Kingdom . |

Primary Examiner—William A. Cuchlinski, Jr.
Assistant Examiner—John L. Beres
Attorney, Agent, or Firm—Griffin, Butler, Whisenhunt & Kurtossy

[57] ABSTRACT

A seal arrangement for sealing a shaft with respect to a housing containing a fluid comprises a face seal exposed to a buffer gas on a portion thereof facing away from the fluid. Disposed upstream of the face seal at the fluid said portion thereof is a collecting chamber for receiving a leakage of the buffer gas having gained access to the fluid-side portion of the face seal. The collecting chamber is in communication with an external separating means for separating the gas phase from the fluid phase of a gas/fluid mixture having collected in the collecting chamber. The fluid phase can be returned into the interior of the housing.

6 Claims, 1 Drawing Sheet

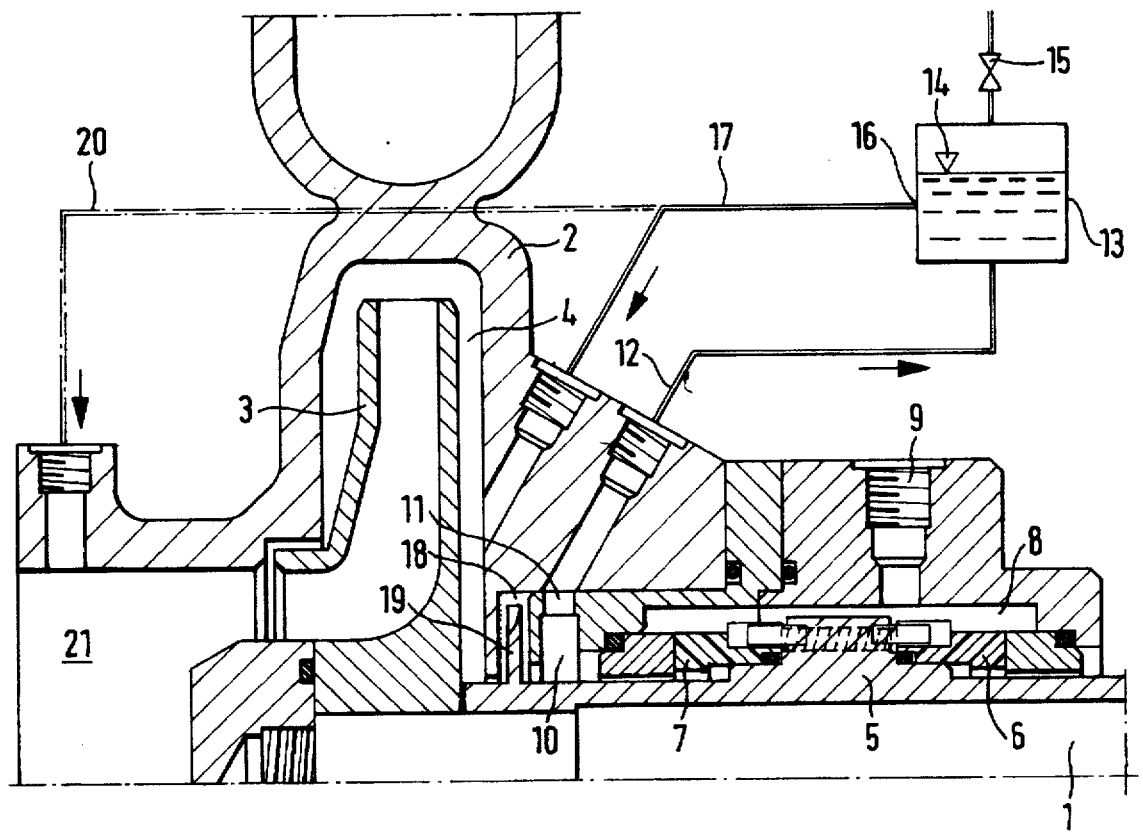
FIGURE

SEAL ARRANGEMENT

BACKGROUND OF THE INVENTION

The invention relates to a seal arrangement for sealing a shaft with respect to a housing containing a fluid, comprising at least one face seal which is exposed to a buffer gas.

The invention thus relates in general to buffer gas lubricated and sealed face seals as employed e.g. for sealing the drive shaft of the impellers of a centrifugal pump for pumping a liquid medium. The buffer gas not only defines and maitains a sealing gap between the interacting sealing faces of the seal rings of the face seal, but also provides an additional effective sealing means for preventing escape of fluid to the environment by the buffer gas being subjected to a higher pressure than that of the fluid to be sealed thereby preventing leakage of the fluid towards that portion of the seal arrangement subjected to the buffer gas. However, in some applications even a very minor gas leakage along the face seal towards or into the region exposed to the fluid is unacceptable since any mixing of the fluid with the gas may result in detriments when further using or processing the fluid.

One object of the invention is to provide a seal arrangement of the aforementioned kind with which any harmful effect of a gas leakage on the fluid to be sealed is avoided. A further object of the invention is to provide a seal arrangement of the aforementioned kind with which the fluid phase can be recovered from a gas/fluid mixture collected to prevent a detrimental effect of the gas leakage on the fluid to be sealed.

SUMMARY OF THE INVENTION

A seal arrangement in accordance with the present invention for sealing a shaft with respect to a housing containing a fluid comprises a face seal exposed to a buffer gas on the portion thereof remote from the fluid, and means disposed upstream of the face seal at the fluid side portion thereof for receiving a leakage of the buffer gas having reached the fluid side portion of the face seal.

According to a preferred embodiment of the invention the receiving means comprise a collecting chamber opening towards the shaft and disposed in radial spacing therefrom in the vicinity of the face seal in which the gas leakage collects with buoyancy effect and/or the effect of a flow of the fluid in a direction towards the face seal. From the collecting chamber the collected mixture of fluid to be sealed and gas leakage can be led off to the outside to separate the fluid phase from the gas phase, in which the fluid phase is preferably returned to the fluid to be treated by the device the seal arrangement of the present invention is associated to. Accordingly, the invention permits a preferred use of a buffer gas lubricated face seal even in applications in which disturbances in processing of the fluid to be sealed would result were the buffer gas to be persistently dispersed therein.

BRIEF DESCRIPTION OF THE DRAWING

The invention will now be explained in more detail with reference to an embodiment and the drawing.

The FIGURE shows in a longitudinal section a seal arrangement in accordance with the invention applied to a centrifugal pump.

DESCRIPTION OF THE PREFERRED EMBODIMENT

Although the invention is described in the following in conjunction with a centrifugal pump for sealing the drive shaft 1 of a pump impeller 3 with respect to a pump housing 2, it will be appreciated that the invention is not restricted to this field of application, the invention instead being able to be employed in other arrangements such as agitators or the like where it is important to prevent a leakage of a buffer gas from coming into contact with the liquid medium or fluid to be sealed.

The face seal arrangement, generally identified by the reference numeral 5, includes a pair of seal ring pairs 6, 7 arranged axially spaced from each other along the shaft 1, each of which comprises a seal ring rotating with the shaft 1 and a seal ring held in a non-rotatable relationship with respect to the pump housing 2. The radial sealing faces of the interacting seal rings form between each other in operation a sealing gap to seal off a sealing chamber 8 defined in the pump housing 2 between the seal ring pairs 6, 7 with respect to the interior or pump space 4 of the pump housing 2 or the outer environment, respectively. The sealing chamber 8 is in communication with an inlet opening 9 via which a suitable buffer gas, e.g. $N_2$, can be introduced into the sealing chamber 8 from a source of buffer gas (not shown). The buffer gas can be subjected to a pressure which is equal to or preferably slightly higher than the pressure of the fluid to be sealed.

Pumping grooves in the sealing faces of the seal rings may be provided to positively introduce the buffer gas between the sealing faces on rotation of the shaft 1 and thus to bring the sealing faces out of contact with each other whilst forming a sealing gap. The seal rings of the seal ring pairs 6, 7 are further biased by a biasing means (not shown) against each other, so that the sealing faces are maintained in sealing contact with each other when the shaft 1 is stationary.

Although, in the embodiment of the invention shown, the sealing chamber 8 is sealed both with respect to the atmosphere and to the fluid by a pair of face seals or seal ring pairs 6, 7 other suitable sealings means, e.g. a packing or the like could be provided at the atmospheric side of the sealing chamber 8. The sealing means on the atmospheric side could also be provided by a so-called gap pot of a magnetic power transfer means for driving the shaft 1.

The configuration of a buffer gas lubricated seal arrangement as described above is known in principle to a person skilled in the art and thus need not to be explained with further details hereinafter.

In accordance with the present invention an arrangement is disposed upstream of the fluid side seal ring pair 7 which is able to intercept a leakage of the buffer gas along the fluid side seal ring pair 7 into the pump space 4 before a mixture of the buffer gas with the fluid to be sealed can occur. For this purpose in the vicinity of the seal ring pair 7 in a portion of the pump housing 2 exposed to the fluid to be sealed, a collecting chamber in the form of an annular groove or recess 10 formed in the pumping housing 2 or a fixed housing part of the seal arrangement is provided which surrounds the shaft 1 with a suitable radial spacing. The collecting chamber 10 opens towards the shaft 1 and comprises in its circumferential bottom wall located furthest away from the shaft 1 an opeaning 11 which is in communication with a conduit 12 by means of which the collecting chamber 10 is connected to a separating vessel 13 outside of the pump housing 2.

Furthermore, in the vicinity of the collecting chamber 10 a pumping means generally identified by the reference numeral 18 is provided. The pumping means 18 comprises a disk-shaped pumping element 19 which is connected to the shaft 1 and extends into a recess having the shape of an annular groove which is defined by adjacent axially spaced end surfaces of a portion of the pump housing 2 surrounding the shaft 1 with radial spacing and of likewise such a portion of a fixed housing part of the seal arrangement, so that the pumping element 19 and the recess define a substantially U-shaped flow path for the fluid, along which the fluid is able to flow from the pump space 4 towards the collecting chamber 10. The pumping element 19 has the effect that on rotation of the shaft 1 a flow of the fluid to be sealed is caused in the direction towards the collecting chamber 10 or the fluid-side seal ring pair 7 thereby a gas leakage along the fluid-side seal ring pair 7 being displaced into the collecting chamber 10 from where it can be discharged into the separating vessel 13.

When the shaft 1 is stationary the gas leakage of the seal ring pair 7 will collect in the collecting chamber 10 even without a pumping effect solely by the buoyance effect of the gas leakage.

The separating vessel 13 can be filled with a liquid up to a suitable level. The gas leakage and any fluid collected in and taken from the collecting chamber 10 is introduced into the separating vessel 13 at the bottom thereof and the gas phase in the gas/fluid mixture ascends in the separating vessel 13 until it is above the level of the fluid therein. A level sensor 14 is provided to detect the level of the fluid in the separating vessel 13 and to furnish a signal when the level has dropped below a predetermined position indicated at 16. At the position 16 a return conduit 17 ports into the separating vessel 13 which connects the interior of the latter to the pump space 4.

A shut-off valve 15 in a conduit porting into the separating vessel 13 above the level of fluid can be opened due to a signal from the level sensor 14 when the quantity of the separated gas in the separating vessel 13 exceeds a value which would result in a reduction of the fluid level below the lower limit 16.

Thus it is assured that the fluid level in any case is above the porting level 16 of the return conduit 17 so that the fluid collected in the separating vessel 13 can be fed back into the pump space 4 without separated gas gaining access to the return conduit 17.

In general the return of the fluid to the pump space 4 is done on the pressure side of the pump impeller 3 as it is indicated by a portion of the return conduit 17 shown in bold lines. If desired, a return could also be done on the suction side of the pump impeller 3 as it is indicated by the broken line return conduit 20 which ports the pump space 4 in a region 21 at the suction side of the pump impeller. The suction effect thereby resulting in the return conduit 20 and extending into the collecting chamber 10 via the separating vessel 13 supports the effect of the pumping means 18. The suction effect in some circumstances may also be sufficient alone to cause a flow of the fluid in the direction towards the collecting chamber 10 so that a pumping means 18 can be eliminated.

The pumping means of the embodiment of the invention as described above includes only a single disk-shaped pumping element rotating in a groove-shaped recess. Several pumping elements could be provided connected in series having corresponding groove-shaped recesses in the pump housing. Instead of a disk-shaped pumping element other suitable pumping means, e.g. a vane wheel, conveyor flights or the like could be used. Furthermore the separating vessel filled with the fluid up to a certain level could be replaced by a cyclone separator to achieve an improved separation of the gas leakage from the mixture of gas leakage and fluid discharged from the collecting chamber. The collecting chamber receiving the gas leakage may consist of a continuous or interrupted annular groove or cavity in the pump housing or any other suitable part of the seal housing. Instead of a single collecting chamber two or more collecting chambers could be arranged axially side by side. The collecting chamber could also be formed by a plurality of cavities formed in the pump housing and distributed circumferentially of the shaft each of which would then need to be provided with a discharge conduit for the leakage gas collected in a cavity.

Whereas a preferred embodiment of the invention has been shown and described, it will be realized that further modifications and alterations may be made without departing from the scope of the invention.

The invention claimed is:

1. A seal arrangement for sealing a shaft with respect to a housing containing a liquid therein, said seal arrangement comprising: a face seal exposed to buffer gas on a gas side of the face seal remote from the liquid in the housing; a collecting chamber surrounding the shaft on a liquid side of said face seal remote from said gas side and communicating with the liquid in said housing for receiving leaked buffer gas reaching the liquid side of said face seal; and a pumping means for pumping a quantity of the liquid within said housing towards said collecting chamber.

2. The seal arrangement as set forth in claim 1, wherein said collecting chamber comprises at least one annular groove opening towards said shaft.

3. The seal arrangement as set forth in claim 1, wherein said collecting chamber is connected via a conduit to an external separating vessel for separating a liquid phase from a gas phase of a gas/liquid mixture collected in said collecting chamber.

4. The seal arrangement as set forth in claim 3, further comprising a return conduit connecting said separating vessel with the interior of the housing for returning the liquid phase separated from the gas phase in said separating vessel into the interior of the housing.

5. The seal arrangement as set forth in claim 4 wherein said seal arrangement is for sealing a drive shaft of a centrifugal pump, and wherein said return conduit ports into a suction side of said centrifugal pump.

6. The seal arrangement as set forth in claim 4, wherein said separating vessel comprises a cyclone separator.

* * * * *